United States Patent
Kalfoglou et al.

(10) Patent No.: US 6,942,031 B1
(45) Date of Patent: Sep. 13, 2005

(54) LIGNOSULFONATE-ACRYLIC ACID GRAFT COPOLYMERS AS SACRIFICIAL AGENTS FOR CARBON DIOXIDE FOAMING AGENTS

(75) Inventors: George Kalfoglou, Houston, TX (US); John Prieditis, Houston, TX (US); Grover Starr Paulett, Richmond, VA (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 08/562,927

(22) Filed: Nov. 27, 1995

(51) Int. Cl.$^7$ .............................................. E21B 43/22
(52) U.S. Cl. .................... 166/273; 166/274; 166/275; 507/207; 507/255
(58) Field of Search ................... 166/268, 273, 166/274, 275; 507/207, 224, 255

(56) References Cited

U.S. PATENT DOCUMENTS

| | | | |
|---|---|---|---|
| 3,882,940 A | * 5/1975 | Carlin | 166/273 |
| 4,133,385 A | 1/1979 | Kalfoglou | 166/273 |
| 4,172,497 A | 10/1979 | Kalfoglou | 166/273 |
| 4,172,498 A | 10/1979 | Kalfoglou | 166/273 |
| 4,196,777 A | 4/1980 | Kalfoglou | 166/273 |
| 4,235,290 A | 11/1980 | Kalfoglou | 166/273 |
| 4,236,579 A | 12/1980 | Kalfoglou | 166/274 |
| 4,249,606 A | 2/1981 | Kalfoglou | 166/273 |
| 4,267,886 A | 5/1981 | Kalfoglou | 166/273 |
| 4,269,270 A | 5/1981 | Kalfoglou | 166/273 |
| 4,344,487 A | 8/1982 | Kalfoglou | 166/274 |
| 4,384,997 A | 5/1983 | Detroit | 260/124 |
| 4,479,542 A | 10/1984 | Warchol et al. | 166/273 |
| 4,703,797 A | 11/1987 | Djabbarah | 166/252 |
| 4,721,161 A | 1/1988 | Richardson et al. | 166/295 |
| 5,009,268 A | 4/1991 | Kalfoglou | 166/274 |
| 5,251,698 A | * 10/1993 | Kalfoglou et al. | 166/274 |
| 5,295,540 A | * 3/1994 | Djabbarah et al. | 166/268 X |
| 5,377,759 A | 1/1995 | Surles | 166/295 |
| 5,513,705 A | * 5/1996 | Djabbarah et al. | 166/273 X |

* cited by examiner

Primary Examiner—George A. Suchfield
(74) Attorney, Agent, or Firm—Harold J. Delhommer

(57) ABSTRACT

The invention is a method for improving conformance during a carbon dioxide foam flood, which comprises injecting into the formation an aqueous solution of about 0.05% to about 5% by weight of a carbon dioxide foaming surfactant, and about 0.05% to about 5% by weight of a lignosulfonate-acrylic acid graft copolymer having about 2% to about 70% by weight of acrylic acid, and injecting into the formation carbon dioxide to sweep the hydrocarbons towards a production well for recovery.

10 Claims, 1 Drawing Sheet

LIGNOSULFONATE-ACRYLIC ACID GRAFT COPOLYMERS AS SACRIFICIAL AGENTS FOR CARBON DIOXIDE FOAMING AGENTS

BACKGROUND OF THE INVENTION

This invention relates to a method of increasing conformance in a carbon dioxide drive flood wherein foaming agents for the injected carbon dioxide are employed. More particularly, the invention pertains to the use of a lignosulfonate-acrylic acid graft copolymer as a sacrificial agent to decrease the adsorption of the carbon dioxide foaming agent within the hydrocarbon reservoir.

Carbon dioxide has a great tendency to channel through oil-in-place since carbon dioxide viscosity may be ten to fifty times lower than the viscosity of the oil-in-place. This problem of channeling through oil is exacerbated by the inherent tendency of a highly mobile fluid such as carbon dioxide to follow the path of least resistance through more permeable rock areas between the injection well and the production well. Thus, areas of high permeability will receive more and more of the injected carbon dioxide, which further raises the effective permeability of such zones. These two factors of channeling through oil due to unfavorable mobility ratios and the tendency of carbon dioxide to take advantage of permeability variations, often make carbon dioxide flooding uneconomical.

Considerable attention has been devoted by the oil industry to the problem of improving steam flood conformance by reducing the permeability of a steam swept zone with a steam foam. The industry is now beginning to focus its research efforts on the use of carbon dioxide foams to improve conformance in carbon dioxide floods. The industry is discovering that some steam foaming agents, but not most, are effective as carbon dioxide foaming agents. The terms steam foaming agent and carbon dioxide foaming agent are not synonymous, just as surfactant and steam foaming agent are not synonymous.

A problem encountered in the use of carbon dioxide foaming surfactants is that the foaming surfactants found to be effective in improving conformance and having sufficient foam stability also have high adsorption on the reservoir matrix. A high adsorption rate decreases the distance that the foaming surfactant can be propagated into the reservoir, and increases the amount of foaming surfactant which must be used, thereby significantly increasing the cost of the carbon dioxide foam project. Although other conditions such as precipitation by polyvalent cations may cause substantial loss of surfactant, the chief factor is usually adsorption on the formation matrix. Such adsorption varies according to the foaming agent used and the type of formation. For instance, some foaming agents may have an acceptable adsorption in a sandstone matrix, but their adsorption onto a carbonate matrix such as found in west Texas may be completely unacceptable.

The literature is replete with various sacrificial agents disclosed for reducing the amount of surfactants retained by a formation matrix, either in a preflush solution injected before the surfactant-containing solution, or in the surfactant solution itself. The compounds are sacrificial in that their adsorption on the formation matrix and entrapment within the pore spaces of the formation reduces the loss of the more expensive foaming agents employed in the carbon dioxide flood.

Although the field of sacrificial agents for carbon dioxide foaming floods is a new one, numerous chemicals have been disclosed in the literature as sacrificial agents to decrease the adsorption of surfactants in hydrocarbon surfactant floods. Lignosulfonates form one class of compounds which have been found to have excellent properties as sacrificial agents in surfactant floods. They are economically attractive because they are by-products of the pulp industry. Supply is plentiful and product costs are much less than the cost of surfactants employed in enhanced oil recovery floods.

The use of various lignosulfonates has been disclosed extensively in the literature. U.S. Pat. Nos. 4,157,115, 4,235,290 and 4,271,906 disclose several methods of using aqueous solutions of lignosulfonate salts as sacrificial agents. The use of oxidized lignosulfonates is disclosed in U.S. Pat. Nos. 4,133,385 and 4,196,777. Chrome lignosulfonates as sacrificial agents are described in U.S. Pat. No. 4,142,582. U.S. Pat. Nos. 4,172,497 and 4,267,886 disclose the use of lignosulfonates carboxylated with chloroacetic acid and U.S. Pat. Nos. 4,172,498 and 4,269,270 disclose sulfomethylated lignosulfonates as sacrificial agents. U.S. Pat. Nos. 4,249,606 and 4,384,997 teach the use of lignosulfonates carboxylated with carbon dioxide and halocarboxylic acid, respectively, as sacrificial agents. U.S. Pat. Nos. 4,236,579 and 4,344,487 disclose the sacrificial agent use of lignosulfonates modified by a variety of chemical reagents. U.S. Pat. No. 4,479,542 describes a sacrificial afterflush method employing lignosulfonates. A mixture of lignosulfonate and polyalkylene glycol is disclosed for sacrificial purposes in U.S. Pat. No. 5,009,268. However, most of these lignosulfonate derivatives suffer from the disadvantage of being too expensive to use as sacrificial agents in a surfactant flood because of the costly chemical modification reactions involved.

A type of lignosulfonate sold under the trademark "MARASPERSE C-21" by American Can Company has been described as a lignosulfonate foaming agent in U.S. Pat. No. 4,703,797. This reference discloses the use of a mixture of a carbon dioxide foaming agent and the specific lignosulfonate foaming agent in conjunction with a displacing medium such as carbon dioxide to improve conformance. The patent describes the lignosulfonate as having the dual functions of sacrificial agent and partial substitute for the foaming agent.

Lignosulfonate-acrylic acid copolymers have been found to be useful for a number of purposes. U.S. Pat. Nos. 3,985,659; 4,322,301; 4,374,738; 4,521,578 and 4,836,940 describe their utility in drilling fluids. U.S. Pat. No. 4,721,161 discloses the use of such copolymers to form an in situ gel to decrease permeability around a wellbore. Copending U.S. patent application Ser. No. 07/903,114, filed Jun. 23, 1992, now U.S. Pat. No. 5,251,668 discloses the use of lignosulfonate-acrylic acid graft copolymers as sacrificial agents for surfactant flooding systems.

SUMMARY OF THE INVENTION

The disclosed invention is a method for improving conformance during a carbon dioxide foam flood, which comprises injecting into the formation an aqueous solution of about 0.05% to about 5% by weight of a carbon dioxide foaming surfactant, and about 0.05% to about 5% by weight of a lignosulfonate-acrylic acid graft copolymer having about 2% to about 70% by weight of acrylic acid, and injecting into the formation carbon dioxide to sweep the hydrocarbons towards a production well for recovery.

The method is applicable to carbon dioxide foam floods, wherein carbon dioxide has been injected into the formation prior to the injection of the aqueous solution, or where the aqueous solution is concurrently injected with the carbon dioxide.

DETAILED DESCRIPTION

Figure 1:
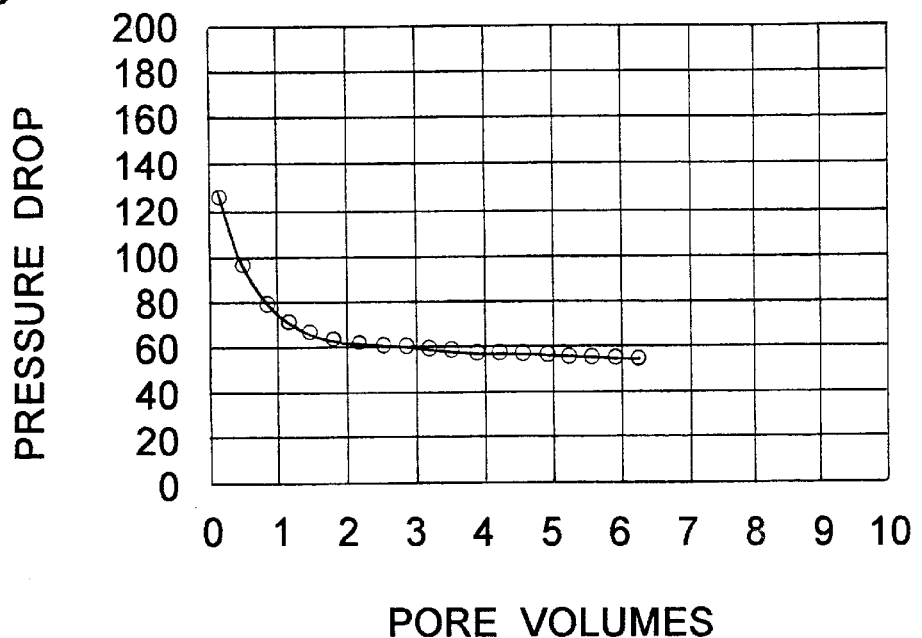
FIG. 1 shows the pressure drop history of a carbon dioxide foam flood in a limestone core.

In carrying out the invention during a carbon dioxide flood, an aqueous solution is injected into the formation comprising about 0.05% to about 5% by weight of a carbon dioxide foaming surfactant and about 0.05% to about 5% by weight of a lignosulfonate-acrylic acid graft copolymer having about 2% to about 70% by weight of acrylic acid. The lignosulfonate-acrylic acid copolymer functions primarily as a sacrificial agent for the carbon dioxide foaming agent. The aqueous solution containing the copolymer may be injected concurrently with the carbon dioxide, prior to the injection of carbon dioxide, or as a slug in between injections of carbon dioxide. The aqueous solution may be injected into the formation prior to or after carbon dioxide breakthrough at a production well. Preferably, the aqueous solution is injected into a carbon dioxide override zone formed by the previous injection of carbon dioxide, and before carbon dioxide breakthrough at a production well. Multiple injections of the aqueous solution may be useful in increasing carbon dioxide conformance.

Preferably, the aqueous solution will have a concentration of about 0.1% to about 2% carbon dioxide foaming surfactant, and about 0.1% to about 2% graft copolymer. We have noticed that with lower concentrations of the carbon dioxide foaming surfactant, about 0.5% to about 1%, the graft copolymer functions well as a sacrificial agent when it has the same concentration in the aqueous solution as the foaming agent.

Although the graft copolymer may be injected in almost any manner to occupy or cover substantially all potential adsorption or retention sites of the rock within the hydrocarbon formation, this will occur in most cases if it is concurrently injected with carbon dioxide foaming surfactant. Preferably, the aqueous solution containing the foaming surfactant and the graft copolymer is also injected in conjunction with carbon dioxide. In this preferred embodiment, the carbon dioxide will naturally carry the foaming agent and graft copolymer to any area of lower permeability or channels formed by carbon dioxide, the ideal places for a foam to decrease permeability and carbon dioxide flow. The phrase "adsorption sites" of the matrix or formation rock is used to mean those portions of the formation rock surface, including matrix pores, which are capable of adsorbing or entrapping a chemical compound from a solution on contact.

Sacrificial agents generally work by one or more of several chemical mechanisms. However, it must be emphasized that these chemical mechanisms are theoretical and the extent to which any one of these mechanisms may be responsible for the effectiveness of a sacrificial agent is unknown. One possible sacrificial mechanism is the complexing of the sacrificial agent with polyvalent cations in solution, leaving less polyvalent cations for the surfactant to interact with. A second possible mechanism is the electrostatic attraction of the matrix and the sacrificial agent for each other. A third possible sacrificial mechanism arises from the fact that polymers have many functional groups and may attach themselves to the rock surface at plural sites, thereby blocking access to other sites on which injected surfactants, solubilizers and polymers could adsorb. In this manner, the large size of polymer molecules may block entrances to very small pores where much of the surface area and many adsorption sites lie.

Furthermore, the character of the formation matrix, be it carbonate, bentonite, kaolinite or something between these three disparate types of substrates, also has a significant impact upon the effectiveness of the sacrificial material. Sacrificial agents which are highly effective in limestone reservoirs may be ineffective when employed in sandstone formations. For instance, polyalkylene glycols, which are known to be effective sacrificial agents in most environments, are more effective in sandstone than carbonate reservoirs. The present invention of using lignosulfonate-acrylic acid graft copolymers is substantially more effective at reducing carbon dioxide foaming agent loss in carbonate or limestone reservoirs than in a sandstone reservoir. Obviously, the chemical structure of the sacrificial agent affects its performance in different reservoirs.

The lignosulfonate-acrylic acid graft copolymers used in the invention method may be prepared by a free radical reaction in which a vinyl monomer such as acrylic acid is polymerized with the lignosulfonate in the presence of a free radical initiator such as hydrogen peroxide and iron sulfate or other well-known free radical initiators. The graft copolymers contain about 2% to about 70%, preferably about 5% to about 40% acrylic acid (or acrylate, depending upon pH) by weight. This polymerization to form lignosulfonate-acrylic acid graft copolymers is described in U.S. Pat. Nos. 3,985,659; 4,276,077; 4,322,301; 4,374,738; 4,387,205; 4,676,317; and 4,891,415.

The copolymers have large numbers of carboxylate groups which increase carbonate reservoir performance. The sulfonate groups permit the copolymers to be used in hard brines.

Last, but not least, both monomers are relatively cheap. Further, the polymerization is easy to carry out and requires no purification. Since acrylic acid is the more expensive component and since the examples show some correlation of increasing performance with increasing acrylic acid content, a balance must be struck between performance and cost for a particular surfactant flood. The cost of the graft copolymers range from about $0.15 to $0.80/lb depending on the acrylic acid content. Solubilized petroleum sulfonate systems cost over $1/lb.

The term "lignosulfonate" encompasses sulfite "lignin" as well as "sulfonated lignin" products. The term "lignin" has its normal connotation, and refers to the substance which is typically recovered from alkaline pulping black liquors, such as are produced in the Kraft, soda and other well known alkaline pulping operations. The term "sulfonated lignin" refers to the product which is obtained by the introduction of sulfonic acid groups into the lignin molecule, as may be accomplished by the reaction of the lignin with sulfite or bisulfite compounds, so that lignin is rendered soluble in water. These are macromolecules built up by complex condensation of phenyl propane units with sulfonate groups attached to the aliphatic side chain. They are water soluble with molecular weights ranging from several thousand to about 50,000 or more. The lignosulfonates most preferred to form the copolymers have a molecular weight of about 10,000 to 40,000.

When a lignosulfonate is coinjected with a surfactant slug, the lignosulfonate molecules have a tendency to move ahead of the surfactant. It is believed that this tendency is due to the much larger size of the lignosulfonate molecules compared to the surfactant molecules. The large graft copolymers of the invention method are just as likely to exhibit this behavior. The larger molecules will pass up many of the smaller rock pores and the smaller surfactant molecules will interact with more of the rock matrix. Thus, in the invention embodiment using a slug of aqueous solution, it may be desirable to inject some graft copolymer immediately behind the aqueous solution of foaming agent and copolymer to insure that a substantial amount of the foaming agent is adequately protected from adsorption and loss.

When sacrificial agents are used in a preflush solution and injected prior to any surfactant system, the length of time before oil recovery is increased since the sacrificial agents will not recover any oil. Any extra time imposed by the flooding process before additional oil recovery may significantly reduce the overall economics of the process. In addition, preflushes in general are often not as effective as expected because of conformity problems and large reservoir volumes. There is no assurance that the flow path of any surfactant solution will sufficiently coincide with that of a preflush sacrificial agent solution.

The performance of postflushes of sacrificial agents may also suffer where a sacrificial agent solution is injected into the reservoir after the injection of the surfactant or polymer system. With a postflush injected after the surfactant system, less surfactant will generally be recovered from the formation because the surfactant system will have already occupied many of the adsorption sites in the matrix and the sacrificial agent will be unable to desorb surfactant and occupy as many adsorption sites as in a preflush or concurrent injection scheme.

The quantity of graft copolymer in aqueous solution should be sufficient to occupy or cover substantially all of the active adsorption sites of the formation matrix in order to achieve a maximum reduction in the amount of carbon dioxide foaming agent loss to the formation. If less than this optimum amount is used, the corresponding reduction in foaming agent loss to the formation will not be as great as in the case where the formation adsorption sites were completely saturated. A balance must be struck with the economics of the carbon dioxide flood. This will most often be between about 0.01 and 0.5 pore volumes of aqueous solution containing the graft copolymer.

The tailoring of a carbon dioxide flood and the use of a lignosulfonate-acrylic acid graft copolymer as a sacrificial agent for the foaming agent will vary with the mineral composition of the formation, the thickness of the formation, the pattern area to be swept and various other formation characteristics. Process design data coupled with field experience can determine the approximate quantity of graft copolymer needed for best results. But it should be noted that foaming agent losses in the field have been found to be invariably higher than the projected losses from laboratory work. This is particularly so when the formation matrix contains large quantities of clays.

Thus, considerable knowledge of the formation matrix and formation fluids is necessary in order to determine the optimum amount of aqueous solution of lignosulfonate-acrylic acid graft copolymer to be injected to achieve the maximum economical reduction in carbon dioxide foaming surfactant loss. If the hydrocarbon formation is relatively clean carbonate lacking substantial clay content, significantly smaller quantities of graft copolymer will be needed than in the case where the formation contains large amounts of highly adsorbent clays.

The effectiveness of using a sacrificial agent of lignosulfonate-acrylic acid graft copolymer for reducing foaming agent loss in carbon dioxide flooding operations is demonstrated by the following examples. These examples are presented for illustrative purposes only and should not be construed to limit the scope of the invention, which is defined in the claims that follow.

EXAMPLES 1–4

The static bottle adsorption tests noted in Examples 1–4 of Table 1 were performed with an ethoxylated sodium sulfate solubilizer ("LN-60COS") having an average of about six ethylene oxide groups ($C_{12-14}(EO)_6SO_4Na$). The solubilized surfactant system was composed of 0.9 wt % "TRS-18", 0.9 wt % "TRS-40", and 0.7% "LN-60COS" by weight.

"TRS-18" is a trademarked oil soluble sulfonate surfactant sold by Witco Chemical Co. having an equivalent weight of about 500. "TRS-40" is a trademarked water soluble petroleum sulfonate surfactant sold by Witco Chemical Co. having an equivalent weight of about 350. "LN-60COS" is a trademarked sulfated $C_{12-14}$ alcohol with an average of about six ethylene oxide groups provided by Texaco Chemical Co.

The brine contained 67,576 ppm TDS (total dissolved solids) including 3744 ppm divalent ions of calcium and magnesium. The tests were performed with a crushed San Andres outcrop core (limestone) having a mesh size between 40 and 100. The test temperature was 104° F. and surfactant concentrations were measured using ASTM Method D3049-89. The lignosulfonate-acrylic acid graft copolymer employed as a sacrificial agent in these tests was a private sample obtained from Georgia-Pacific Corporation containing 5.66% by weight acrylic acid. The lignosulfonate monomer was a calcium salt of "LIGNOSITE 100", a trademarked softwood lignosulfonate sold by Georgia-Pacific Corp. The sample was labeled E5077 by Georgia-Pacific Corp.

TABLE 1

ADSORPTION REDUCTION OF SURFACTANT ON CRUSHED LIMESTONE CORE

| Ex. | Surfactant | Adsorption, mg/g | Adsorption Reduction, % |
|---|---|---|---|
| 1 | 1.0 wt % Solubilizer | 0.91 | — |
| 2 | 1.0 wt % solubilizer/ 0.5 wt % GP-E5077 | 0.02 | 98 |
| 3 | 2.5 wt % Surfactant System | 1.63 | — |
| 4 | 2.5 wt % Surfactant System/ 2% GP-E5077 | 0.39 | 76 |

Brine: 67,576 ppm, 3744 ppm calcium and magnesium.

The adsorption for the 1.0% percent solubilizer solution of "LN-60COS" was reduced almost 100% by the 0.5 wt % lignosulfonate-acrylic acid copolymer added in Example 2. A greater amount of the graft copolymer was required to reduce adsorption of the solubilized surfactant system. However, the 76% adsorption reduction for the surfactant system is considered a good result since that particular surfactant system is very adsorptive and the adsorption of petroleum sulfonates is more difficult to reduce in a limestone environment.

EXAMPLES 5–19

The reduction of adsorption of 0.5% by weight solutions of "NES-25" surfactant was examined with several different lignosulfonate-acrylic acid graft copolymers employed as sacrificial agents. The brine employed included 36,000 ppm TDS with 2124 ppm calcium and magnesium ions.

The different graft copolymers employed were: "KELIG 4000", D-379-11, and a series of Georgia-Pacific supplied graft copolymers labeled GP-E5077, GP-E5078, GP-E5079, GP-E5080, GP-E5085 and GP-E5086. The adsorption reduction of Lignosite 100 was also tested.

"NES-25" is a trademarked ethoxysulfonate surfactant having nine to eleven carbon atoms in the aliphatic chain and an average of about 2.5 ethylene oxide groups sold by Henkel Corp. "KELIG 4000" is a trademarked lignosulfonate-acrylic acid graft copolymer sold by Daishowa Chemical Co. having 43% acrylic acid by weight. D-379-11 is a laboratory graft copolymer prepared by Daishowa Chemical Co., which is a higher molecular weight version of the "KELIG 4000", and has the same 43% by weight acrylic acid content. The Georgia-Pacific supplied samples labeled E5077 through E5086 were lignosulfonate-acrylic acid graft copolymer samples supplied by Georgia-Pacific Corporation which contain from 5.66 wt % to 50 wt % acrylic acid. The higher numbers have higher amounts of acrylic acid as noted in Table 2. These samples were prepared by reacting the calcium salt of "LIGNOSITE 100" with different amounts of acrylic acid. The molecular weight of "LIGNOSITE 100" ranges from about 10,000 to 40,000. Thus, it is believed that the E5077 through E5086 samples have molecular weights ranging from about 10,000 to 80,000.

TABLE 2

REDUCTION OF NES-25 ADSORPTION
ON CRUSHED LIMESTONE CORE

| Ex. | Additive, wt % | Adsorption, mg/g | % Acrylic acid | Adsorption Reduction, % |
|---|---|---|---|---|
| 5 | None | 0.58[1] | — | — |
| 6 | 0.5% "KELIG 4000" | 0.14 | 43 | 76 |
| 7 | 0.5% D-379-11 | 0.08 | 43 | 86 |
| 8 | 0.5% "LIGNOSITE 100" | 0.49 | 0.00 | 16 |
| 9 | 0.5% GP-E5077 | 0.03 | 5.66 | 95 |
| 10 | 0.5% GP-E5078 | 0.08 | 9.09 | 86 |
| 11 | 0.5% GP-E5079 | 0.02 | 13.04 | 97 |
| 12 | 0.5% GP-E5080 | −0.04 | 23.08 | 100 |
| 13 | 0.1% "LIGNOSITE 100" | 0.46 | 0.00 | 21 |
| 14 | 0.1% GP-E5077 | 0.28 | 5.66 | 52 |
| 15 | 0.1% GP-E5078 | 0.29 | 9.09 | 50 |
| 16 | 0.1% GP-E5079 | 0.23 | 13.04 | 60 |
| 17 | 0.1% GP-E5080 | 0.03 | 23.08 | 95 |
| 18 | 0.1% GP-E5085 | 0.04 | 33.33 | 93 |
| 19 | 0.1% GP-E5086 | −0.02 | 50.00 | 100 |

"NES-25" concentration 0.5 wt %.
[1]Average of four measurements.
Brine: 36,000 ppm TDS, 2124 ppm calcium and magnesium.

A 0.5 wt % concentration of "KELIG 4000" and D-379-11 was found to reduce the adsorption of 0.5 wt % "NES-25" on the San Andres limestone core by 76% and 86%, respectively. This adsorption reduction was about the same as that obtained with a 2% by weight oxidized lignosulfonate sold under the trademark "MARASPERSE 92 ZCAA" by Marasperse Chemical Co., but at a one-fourth concentration of sacrificial agent. However, as the "KELIG 4000" and D-379-11 contained about 43% acrylic acid by weight, they may be too expensive to use as sacrificial agents.

Much better results were achieved with the Georgia-Pacific supplied compounds polymerized from "LIGNOSITE 100". Surfactant adsorption was reduced 95% with 0.5 wt % of a lignosulfonate graft copolymer containing only 5.66% acrylic acid in Example 9. Examples 11 and 12 also provided strong results with surfactant adsorption reductions of 97% to 100% with graft copolymers containing 13% and 23% acrylic acid by weight, respectively.

Examples 13–19 were run with much smaller concentrations of the graft copolymer sacrificial agent. Exceptional results were obtained with Examples 17–18 where surfactant adsorption was reduced 93% to 95% with only 0.1% by weight of the sacrificial agent. As is apparent from Table 2, the concentration of the lignosulfonate-acrylic acid graft copolymer and the amount of acrylic acid can be optimized to give the lowest cost overall for the sacrificial agent.

EXAMPLES 20–32

The lignosulfonate-acrylic acid graft copolymers were also tested for reduction of adsorption for a solubilized surfactant system on the same limestone matrix. The "SALEM" surfactant system employed in Examples 3–4 was chosen as a typical solubilized surfactant system for this test. Concentrations of 1.0 wt % and 2.5 wt % of the graft copolymers were prepared and equilibrated with the 2.5 wt % "SALEM" surfactant system and the crushed limestone matrix. Table 3 illustrates the results.

TABLE 3

REDUCTION OF SALEM SURFACTANT SYSTEM
ADSORPTION ON CRUSHED LIMESTONE CORE

| Ex. | Additive, wt % | Adsorption, mg/g | % Acrylic acid | Adsorption Reduction, % |
|---|---|---|---|---|
| 20 | None | 0.98 | 0.00 | — |
| 21 | 1.0% "LIGNOSITE 100" | 0.64 | 0.00 | 35 |
| 22 | 1.0% GP-E5077 | 0.41 | 5.66 | 58 |
| 23 | 1.0% GP-E5078 | 0.15 | 9.09 | 85 |
| 24 | 1.0% GP-E5079 | 0.10 | 13.04 | 90 |
| 25 | 1.0% GP-E5080 | 0.05 | 23.08 | 95 |
| 26 | 1.0% GP-E5085 | −0.05 | 33.33 | 100 |
| 27 | None | 0.73 | 0.00 | 0 |
| 28 | 2.5% "LIGNOSITE 100" | 0.71 | 0.00 | 3 |
| 29 | 2.5% GP-E5077 | 0.11 | 5.66 | 85 |
| 30 | 2.5% GP-E5078 | −0.10 | 9.09 | 100 |
| 31 | 2.5% GP-E5079 | −0.35 | 13.04 | 100 |
| 32 | 2.5% GP-E5080 | −0.17 | 23.08 | 100 |

Salem surfactant system; 0.9 wt % "TRS-18"; 0.9 wt % "TRS-40"; 0.7 wt % "LN-60COS".
Brine: 67,566 ppm TDS; 3744 ppm calcium and magnesium.

Examples 24–25 and 30–31 had outstanding adsorption reductions. For the 1% sacrificial agent concentrations of Examples 24–25, the copolymers having 13% and 23% acrylic acid gave adsorption reductions of 90% and 95%, respectively. Although the 2.5% sacrificial agent examples of 30–31 gave 100% adsorption reductions with lower concentrations of the more costly acrylic acid (9% and 13%), it must be remembered that such 2.5% solutions of sacrificial agent have a raw materials cost almost 2.5 times that of 1% sacrificial agent solutions having approximately the same acrylic acid content.

EXAMPLES 32–33

Because a compound works as a sacrificial agent for a surfactant on matrix material does not mean such a compound would be effective as a sacrificial agent for a foaming agent in a carbon dioxide foam flood. The chief reason is that some sacrificial agents may have a detrimental effect on the stability of foams, even though they may work well in preserving the actual surfactant that creates the foam. Some agents may interfere with the mobility reduction of carbon dioxide gas in cores. Thus, once a sacrificial agent is tested to determine its effectiveness to reduce foaming surfactant adsorption, it must also be tested to establish its effect on carbon dioxide gas mobility in cores.

Figure 2:
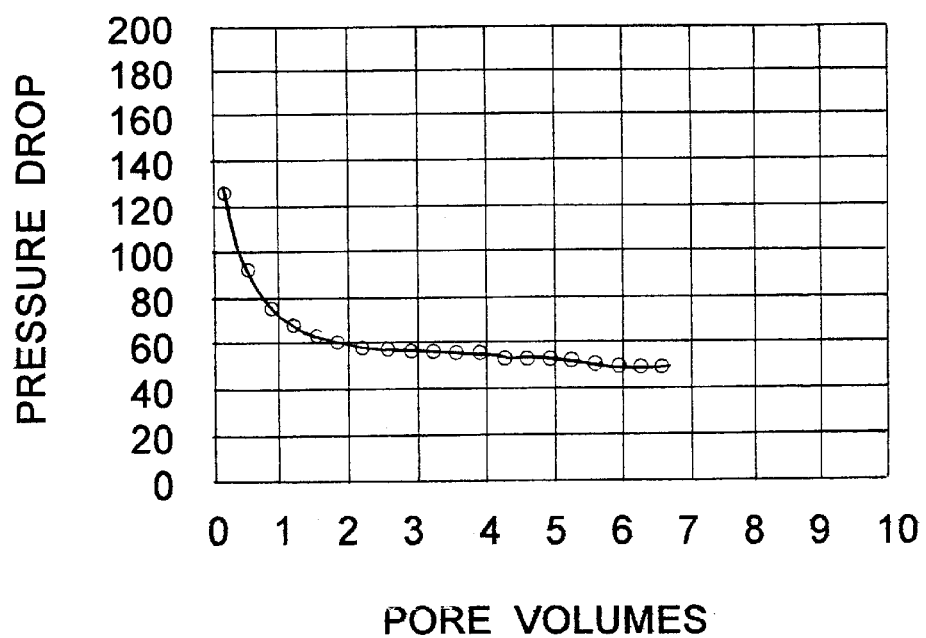
FIG. 2 illustrates the pressure drop history for a carbon dioxide foam flood in a limestone core with the additional injection of a lignosulfonate-acrylic acid graft copolymer.

Examples 32 and 33, recorded in FIGS. 1 and 2, were gas mobility reduction tests run with 0.5 wt % "NES-25" in a Mabee, Texas core of limestone, 1.5 inches in diameter and 3.0 inches long with a 12.3 milliliter pore volume. The core contained miscible residual oil. Surfactant was injected followed by carbon dioxide. The pressure drop in psi was measured as a function of the pore volumes of carbon dioxide injected. FIG. 1 illustrates the results for 0.5 wt % "NES-25".

An identical test was run for FIG. 2 using 0.5 wt % "NES-25" with added 0.5 wt % "KELIG 4000". A comparison of FIGS. 1 and 2 indicates that the lignosulfonate-acrylic acid graft copolymer "KELIG 4000" had no effect on the gas mobility reduction of the "NES-25" in the carbon dioxide foam flood. Thus, the lignosulfonate-acrylic acid graft copolymers should be effective sacrificial agents for reducing carbon dioxide foaming agent loss in carbon dioxide floods.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method for improving conformance to reduce channeling and carbon dioxide foaming agent loss during a carbon dioxide flood in an underground hydrocarbon formation penetrated by at least one injection well and at least one production well, which comprises:

injecting into the formation through an injection well an aqueous solution comprising about 0.05% to about 5% by weight of a carbon dioxide foaming surfactant and about 0.05% to about 5% by weight of a lignosulfonate-acrylic acid graft copolymer additive having about 2% to about 70% by weight of acrylic acid; and then injecting into the formation through an injection well carbon dioxide to sweep hydrocarbons to a production well for recovery.

2. The method of claim 1, further comprising the injection of carbon dioxide into the injection well prior to the injection of the aqueous solution.

3. The method of claim 2, wherein the aqueous solution is injected into the formation prior to carbon dioxide breakthrough at a production well.

4. The method of claim 2, wherein the aqueous solution is injected into the formation after carbon dioxide breakthrough at a production well.

5. The method of claim 1, further comprising the concurrent injection of the aqueous solution with the carbon dioxide.

6. The method of claim 1, wherein the aqueous solution has a concentration of about 0.1% to about 2% carbon dioxide foaming surfactant and about 0.1% to about 2% graft copolymer.

7. The method of claim 1, wherein the aqueous solution is injected into a carbon dioxide override zone.

8. The method of claim 1, wherein the carbon dioxide foaming surfactant is an ethoxylated alkyl sulfonate.

9. The method of claim 1, wherein the graft copolymer has about 5% to about 40% acrylic acid by weight.

10. A method for improving conformance during a carbon dioxide flood in an underground hydrocarbon formation penetrated by at least one injection well and at least one production well, which comprises:

injecting carbon dioxide into the formation through an injection well to a carbon dioxide flood;

injecting into the formation through an injection well an aqueous solution comprising about 0.1% to about 2% by weight of a carbon dioxide foaming surfactant and about 0.1% to about 2% by weight of a lignosulfonate-acrylic acid graft copolymer stabilizing additive having about 5% to about 40% by weight of acrylic acid to stabilize the foamed carbon dioxide; and injecting into the formation through an injection well carbon dioxide to sweep hydrocarbons to a production well for recovery.

* * * * *